United States Patent [19]

Bright et al.

[11] Patent Number: 4,975,735

[45] Date of Patent: Dec. 4, 1990

[54] DOCUMENT CARRIER FORM FOR SCANNING AND MICROFILMING OPERATIONS

[75] Inventors: James E. Bright, Denton; Heather T. Bouchier, Dallas, both of Tex.

[73] Assignee: Moore Business Forms, Inc., Grand Island, N.Y.

[21] Appl. No.: 462,507

[22] Filed: Jan. 8, 1990

[51] Int. Cl.⁵ .............................................. G03B 27/62
[52] U.S. Cl. ........................................ 355/75; 355/40; 355/77
[58] Field of Search ..................... 355/39, 40, 75, 133, 355/77, 132

[56] References Cited

U.S. PATENT DOCUMENTS

| | | | |
|---|---|---|---|
| 3,025,778 | 3/1962 | Stuckens | 355/75 X |
| 3,152,528 | 10/1964 | Pendry | 355/75 X |
| 3,721,173 | 3/1973 | Jaffe | 355/75 |
| 3,974,582 | 8/1976 | Jantzen, Jr. | 355/75 X |
| 3,976,376 | 8/1976 | Hujer | 355/133 |
| 4,028,107 | 6/1977 | Henley, III | 355/75 X |
| 4,037,956 | 7/1977 | McKeen, Jr. | 355/75 X |
| 4,118,120 | 10/1978 | Ruffner et al. | 355/75 |
| 4,286,869 | 9/1981 | Kogane et al. | 355/75 |
| 4,309,102 | 1/1982 | Pudark et al. | 355/75 X |
| 4,588,291 | 5/1986 | Lulay et al. | 355/75 X |
| 4,637,712 | 1/1987 | Arnold et al. | 355/39 X |
| 4,645,331 | 2/1987 | Berger | 355/75 X |

Primary Examiner—Richard A. Wintercorn
Attorney, Agent, or Firm—Nixon & Vanderhye

[57] ABSTRACT

The feeding of documents through optical equipment (such as OCR scanners, microfilming equipment, etc.) is facilitated by providing pocketed document carriers. Each document carrier has a transparent plastic film first part and a white paper second part, with adhesive along some of the edges between the parts defining a pocket, with at least one of the edges open to allow the insertion of one or more documents into the pockets. The carriers, containing the documents, are intermixed in a desired sequence with documents that are full size (e.g., having a size substantially the same as the document carriers) for automatic or hand feeding through the optical equipment. A number of different pocket configurations may be provided, including a duplex construction.

24 Claims, 2 Drawing Sheets

DOCUMENT CARRIER FORM FOR SCANNING AND MICROFILMING OPERATIONS

BACKGROUND AND SUMMARY OF THE INVENTION

There are many businesses which rely on the automatic feeding of documents into optical equipment in order to process the documents. Typical optical equipment utilized in such industries include optical scanning equipment for OCR numbering, MICR check reading equipment, standard microfilming or microfiche equipment, and video imaging equipment, etc. Often times such businesses are presented with numerous different sizes of documents which are intermixed with each other, and which must remain together in a particular sequence Automatic sheet feeding devices have limitations on the size variances that can be tolerated, and hand feeding devices also have limitations on sheet size variations. Such limitations cause additional time and labor in preparing documents for optical action.

According to the present invention, the expense and difficulties associated with conventional feeding of intermixed sizes of documents into optical acting equipment are minimized. However, document integrity is maintained, and it is possible to insure that a particular sequencing of documents is provided. These advantageous results are effectively accomplished by utilizing particular document carriers.

According to one aspect of the present invention, the document carrier for efficiently transporting documents to be optically acted upon is provided. The document carrier comprises: A quadrate first part of transparent material which allows clear, non-interfering, scanning or microfilming of a document underlying it. A quadrate second part of non-adhesive material providing a clear discrimination background for the document, and allowing readable indicia to be placed thereon (the first and second parts have generally the same exterior length or width). And, means for attaching the first part to the second part to allow placement and positioning of at least one document therebetween.

The first part is preferably of transparent plastic sheet material, such as polypropylene or polystyrene film, having approximately a 0.92 gauge. The second part is preferably of white sheet material, such as white bond or offset paper, having a weight of about 20-24 lb. bond paper, or an equivalent weight (i.e., about 70 pounds) for offset paper. A number of different configurations can be provided for defining pockets for the positioning of documents therein. In one embodiment, the means for attaching the first part to the second part comprises adhesive for attaching the parts together along three sides of the first part to form a pocket, with the fourth side of the first part unconnected to allow insertion of the document into the pocket between the first and second parts. The adhesive may comprise three strips of adhesive including a first strip with a width of about 1 inch. Multiple pockets may be formed. A number of different dimensions may be utilized, but a standard dimension would be about 10×12½ inches for the entire carrier, with the pocket or pockets having approximately 8½×11 inch dimensions. A second part may have a width or length dimension slightly larger than that of the first part to define a second part portion not covered by the first part. Indicia may be provided on the second part unexposed portion, or another portion of the second part, which indicia also may be read by optical equipment with which the document carrier is intended to be used.

As used in the present specification and claims, the term "optically acting upon" means a review, by optical means, of a document with optical equipment for the purpose of transferring information from the document into another form, such as a mag tape, digital or analog information for a computer system, microfilm, or microfiche. The term "optical equipment" as used in the present specification and claims encompasses OCR, bar code, MICR, and light scanning and reading equipment, video imaging equipment, and standard microfilm or microfiche producing equipment.

According to another aspect of the present invention there is provided a method of optically acting upon variously sized documents without optical equipment, utilizing substantially uniformly sized, pocketed, document carriers, each having a transparent first part and a second part having clear discrimination and document identification functionality. The method comprises steps of: (a) inserting documents having a size smaller than the substantially uniformly sized document carriers into pocketed document carriers so that they are held in pockets between the transparent first part and second part of each carrier; and (b) feeding the document carriers in sequence past the optical equipment. Documents having substantially the same size as the uniformly sized document carriers also are preferably provided, and step (b) is accomplished by feeding documents of substantially the same size as the document carriers with the document carriers, past the optical equipment, in predetermined sequence.

The method also preferably comprises the further step of placing indicia on the second part of at least some of the document carriers, which indicia is optically acted upon along with the documents, or is at least human readable. Two portions of each document carrier first part may sandwich the second part of the document carrier between them, in which case step (a) is practiced by placing two different documents into operative association with each document carrier, one on each side of the second part of the document carrier, between the second part and a portion of the first part of the document carrier. Further, the second part may have a length or width dimension larger than the first part to define the second part portion not covered by the first part, in which case step (a) is further practiced by holding the second part portion not covered by the first part while inserting at least one document into a pocket between the first and second parts.

It is the primary object of the present invention to provide for the effective and efficient handling of non-uniformly sized documents in association with optical equipment. This and another objects of the invention will become clear from an inspection of the detailed description of the invention and from the appended claims.

DETAILED DESCRIPTION OF THE DRAWINGS

Figure 1:
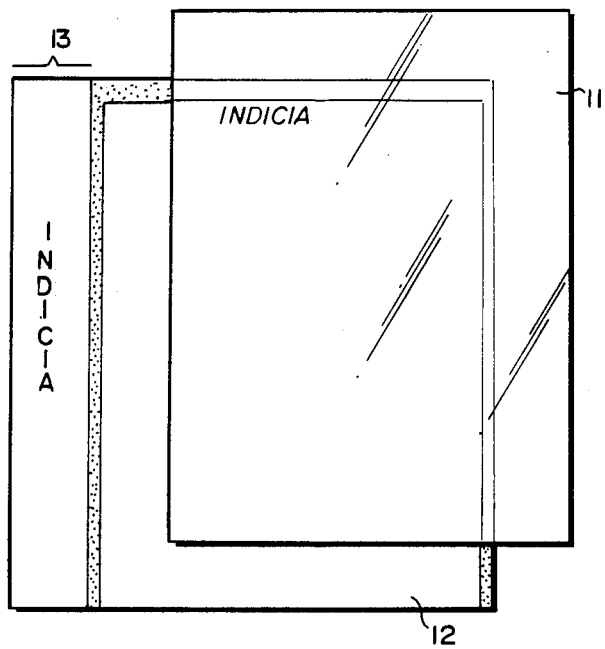
FIG. 1 is an exploded plan view of an exemplary document carrier according to the present invention.
Figure 2:
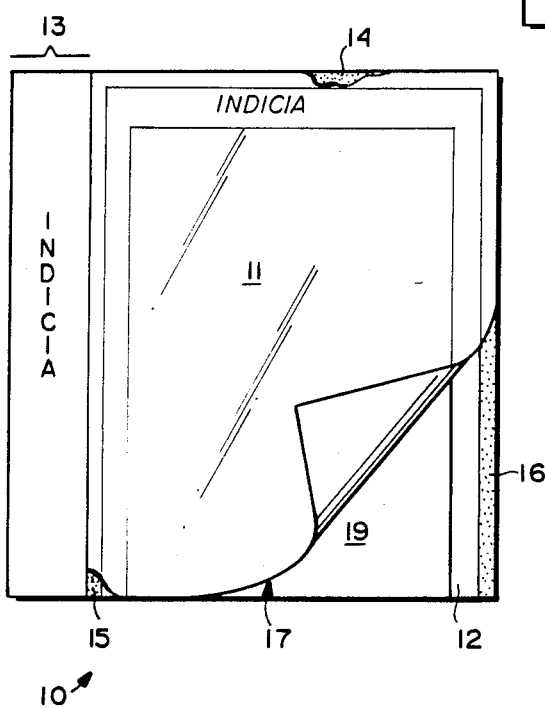
FIG. 2 is a top plan view of the document carrier of FIG. 1 in assembled condition, with a portion of the transparent first part peeled back for clarity of illustration.
Figure 3:
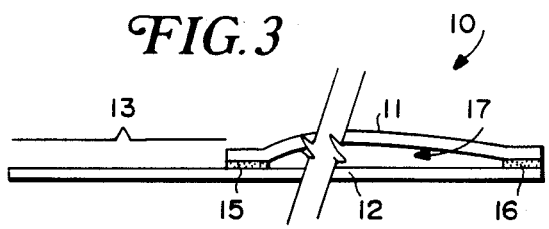
FIG. 3 is an end view of the document carrier of FIG. 2, looking in at the "bottom" thereof.

An exemplary document carrier according to the present invention is shown generally by reference numeral 10 in FIGS. 1 through 3. A document carrier 10 comprises a quadrate (preferably rectangular) first part 11 of transparent material which allows clear, noninterferring scanning or microfilming of the document underlying it. The carrier 10 also comprises a quadrate (preferably rectangular) second part of sheet material providing a clear discrimination background for the document, and allowing readable indicia (as indicated in FIGS. and 1 and 2) to be placed thereon.

First part 11 preferably comprises transparent plastic sheet material, such as polypropylene or polystyrene film. While the weight of the plastic film 11 may vary, it is preferred that it be approximately 0.92 gauge. The second part 12 preferably is of white sheet material, preferably white paper. White offset paper having a weight of about 70 pounds is optimum. White bond paper having a weight of about 20-24 pounds also may be utilized (with an equivalent weight variation for offset paper). Utilizing a film gauge and paper weight as indicated above, it is possible to maintain document carrier 10 so that it is sturdy enough to be reused many times and positively fed through the optical equipment with which it is to be utilized with automatic sheet handling equipment, yet thin enough so that it does not jam in or adversely affect the sheet handling equipment.

It is preferred that the parts 11, 12 have substantially the same size, in fact, they may have exactly the same length and width. In the embodiment illustrated in FIGS. 1 through 3, however, while the parts 11, 12 have substantially the same size, second part 12 has a length and width dimension that is slightly larger than that of the first part 11, defining a second part portion 13 that is not covered by the first part 11. This portion 13 may be grasped by a user for ease of handling in inserting documents between the first and second parts 11, 12, and/or indicia may be readily applied thereto. Any indicia applied to the portion 13 may be readily changed by a user.

Document carrier 10 also comprises means for attaching the first and second parts 11, 12 to each other to define a pocket, allowing placement and positioning of at least one document in the pocket, between the first and second parts 11, 12. The attaching means preferably comprises strips of adhesive 14, 15, 16 formed along three sides of the first part 11 (typically applied to the second part 12) with the fourth side of the part 11 remaining open, as illustrated by reference numeral 17 in FIGS. 2 and 3. One or more documents 19 (see FIG. 2) may then be readily inserted through the opening 17 into the pocket between the parts 11, 12.

While dimensions of the document carrier 10 may vary widely depending upon the particular equipment utilized, documents, etc. However, for the embodiment illustrated in FIGS. 1 through 3, the sheet 12 has dimensions of about $11\frac{1}{2} \times 12\frac{5}{8}$ inches, while the sheet 11 has dimensions of about $9\frac{1}{2} \times 12\frac{5}{8}$ inches. The glue strip 14 has a width of about one inch, while the glue strips 15, 16 have widths of substantially less than one inch, e.g., about $\frac{1}{4}$ inch. A pocket formed between the sheets 11, 12 for the insertion of document 19 therefore has dimensions of about $8\frac{1}{2} \times 11$ inches.

Of course, other attachment means besides adhesive may be utilized, such as crimps in the sheet material, mechanical fasteners, and the like.

Figure 4:
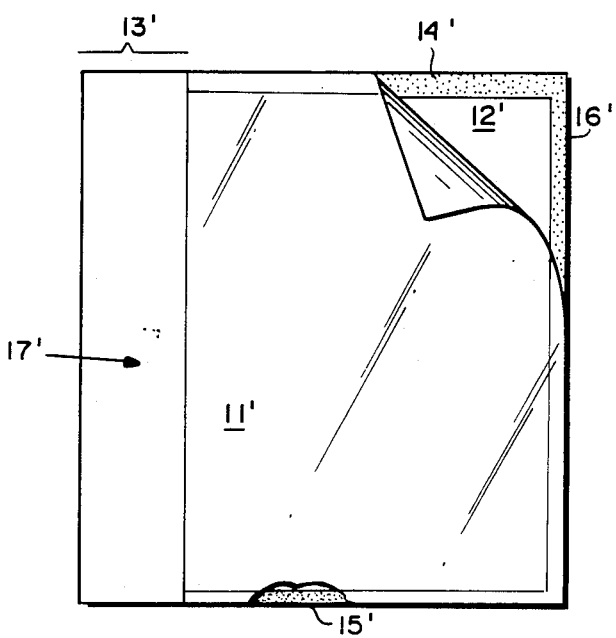
FIG. 4 is a view like that of FIG. 2 only showing another exemplary embodiment of the document carrier according to the invention.

FIG. 4 illustrates a second embodiment of a document carrier according to the invention. In FIG. 4 the same components as in the FIGS. 1 through 3 embodiment are denoted by the same reference numeral only with a "'" thereafter. The main difference between the document carrier 10' and document carrier 10 is that the pocket opening 17' is on the "side" rather than the "bottom" of the carrier 10'. That is, the pocket 17' opens at the extended portion 13' of the second part 12'. In this embodiment it is also desirable to have the plastic film part 11' with a slightly less width than in the FIGS. 1 through 3 embodiment (e.g., about $9\frac{1}{4}$ inches instead of $9\frac{1}{2}$ inches for the FIGS. 1 through 3 embodiment).

Figure 5:
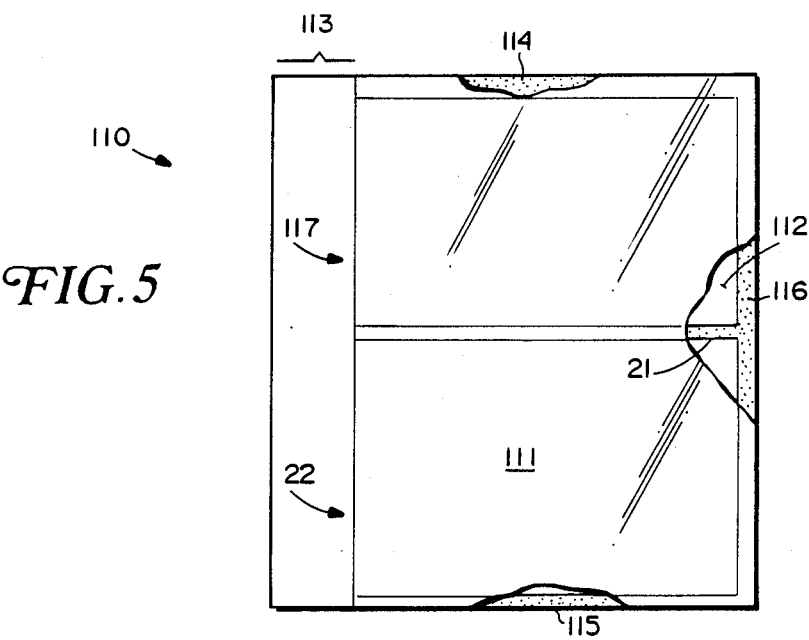
FIG. 5 is a view like that of FIG. 2 only showing a still further exemplary embodiment of the document carrier according to the invention.

FIG. 5 illustrates another exemplary embodiment of a document carrier according to the invention. In this embodiment, structures having essentially the same function as those in the FIGS. 1 through 3 embodiment are illustrated by the same reference numeral only preceded by "1". In this embodiment, an additional attaching mechanism, such as adhesive strip 21, is provided between the parts 111, 112, so as to define two pockets rather than one. The first pocket has a side opening 117, while the second pocket has a side opening 22. In this embodiment, the glue strip 114 has a width of about one inch, while the glue strips 115 and 116 have widths of about $\frac{3}{8}$ths of an inch, and the glue strip 21 a width of about $\frac{1}{4}$ of an inch. The sheet 111 has approximately the same dimensional relationship with respect to the sheet 112 as in the FIGS. 1 through 3 embodiment.

Figure 6:
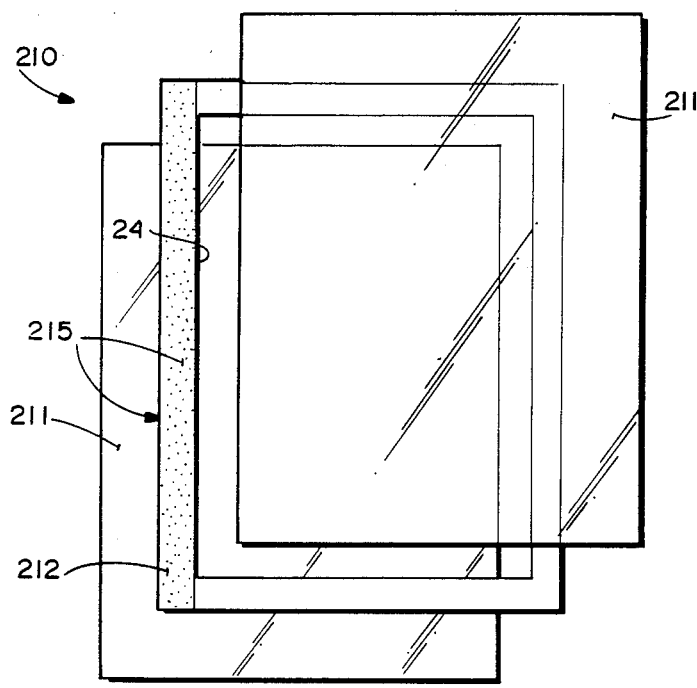
FIG. 6 is an exploded plan view of another alternative configuration of document carrier according to the invention.
Figure 7:
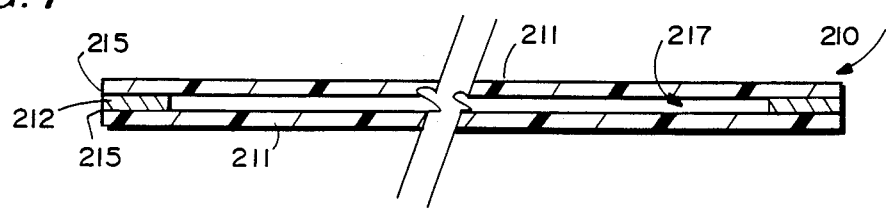
FIG. 7 is a cross-sectional view of the document carrier of FIG. 6 when in assembled condition.

FIGS. 6 and 7 illustrate a "duplex" document carrier 210 according to the invention. In this embodiment, components comparable to those in the FIGS. 1 through 3 embodiment are illustrated by the same reference numerals only preceded by a "2". This embodiment is designed to receive two documents facing outwardly from each other, one having the printing of the document overlaid by each of the first part transparent films 211. In this embodiment, adhesive, such as indicated generally by reference numeral 215 in FIG. 6, is applied to the opposite faces of one edge of the second part 212 while the other edges are free, or at least one of the other edges is free to allow insertion of documents on opposite sides of the second part 212, as illustrated generally by reference number 217 in FIG. 7. Also while the second part 212 may be a solid sheet, as illustrated in FIGS. 6 and 7 there may be provided means defining a quadrate cutout 24 therein, so that only a white border is provided by the second part 212 of the carrier 210 surrounding the document received thereby.

While indicia is illustrated only with respect to the first embodiment of FIGS. 1 through 3, preferably indicia is provided on the second part of the document carrier (where it can even be provided on the first part) in all of the embodiments, such as optical readable indicia or the like. A wide variety of indicia can be provided, such as human readable indicia, OCR, MICR, or like indicia, or combinations thereof.

In practice, the method according to the present invention, the document carriers are typically utilized with and intermixed with documents having substantially the same size as the uniformly sized document carriers. However, wide variations in size between the carriers and the documents are not appropriate—that is, they must be of substantially the same size so that they can be acted upon by conventional handling equipment. For example, with respect to the FIGS. 1 through 3 embodiment, where the maximum dimensions of document carrier 10 are $11\frac{1}{2} \times 12\frac{5}{8}$ inches, the documents, which may be intermixed therewith, typically would have dimensions of about $8\frac{1}{2} \times 11$ inches. All documents having a size smaller than about $8\frac{1}{2} \times 11$ inches, or documents which are crumpled, torn, or less than complete, are inserted through the opening 17 into the pocket formed between the parts 11, 12 for feeding into association with the optical equipment. More than one document may be inserted into a pocket associated with document carrier 10 if appropriate for the purposes of optically acting upon the documents and the method.

One typical example of utilization of the document carriers is in the optical reading of insurance forms and receipts. Typically, a health insurance form will have printed information, variable information inserted by the subscriber and receipts for medicines, doctor's visits and the like. While the form itself is typically $8\frac{1}{2} \times 11$ inches, the receipts may be of many different sizes. In the feeding of information so that it may be maintained approximate (in the desired sequence) into an optical reader or the like, the $8\frac{1}{2} \times 11$ inch insurance form (unless damaged) need not be inserted into a document carrier 10, but should be fed through directly. Immediately after the insurance form, there would be provided as many document carriers 10 as necessary to support the receipts associated with that particular insurance form. More than one receipt could be provided in each of the document carriers 10, and as many document carriers would be provided in sequence as was necessary so as to read all of the receipts associated with an insurance form directly after the insurance form. The original document (insurance form) and document carriers retaining the receipts in the pockets thereof, are fed in sequence past the optical equipment, whether it be an OCR scanner, microfilm or microfiche forming equipment, video imaging equipment, etc.

When the FIG. 5 embodiment of document carriers are utilized, different documents associated with the same transaction are inserted into the two (or more) pockets through the openings 117, 22, to be separately retained by the carrier 110. In the FIGS. 6 and 7 embodiment, two documents are placed face up in association with each of the films 211 within the opening 24, being retained therein by the films 211 where the part 12 has a portion 13 uncovered by the first part 11, the portion 13 typically is grasped by the user when inserting the document 19 into the pocket, and the user may place variable data on the portion 13 and when the document carrier 10 is reused, may remove the variable data and insert other variable data. The document carriers 10 are designed for reuse so that after feeding through the optical equipment, the document or documents 19 are removed from the pockets thereof, and new documents are inserted.

It will thus be seen according to the present invention an efficient and effective method and props for optically acting upon variously sized documents has been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of optically acting upon variously sized documents with optical equipment, utilizing substantially uniformly sized pocketed document carriers each having a transparent first part, and a second part having clear discrimination and document identification functionality, comprising the steps of:
    (a) inserting documents having a size smaller than said substantially uniformly sized document carriers into pocketed document carriers so that they are held in pockets between the transparent first part and second part of each carrier; and
    (b) feeding the document carriers in sequence past the optical equipment.

2. A method as recited in claim 1 further utilizing documents having substantially the same size as said uniformly sized document carriers, and wherein step (b) is accomplished by feeding documents of substantially the same size as the document carriers, with the document carriers, past the optical equipment, in predetermined sequence.

3. A method as recited in claim 1 comprising the further step of placing indicia on the second part of at least some of the document carriers, which indicia is optically acted upon with the documents.

4. A method as recited in claim 1 comprising the further step of placing human readable indicia on the second part of at least some of the document carriers.

5. A method as recited in claim 1 wherein two portions of each document carrier first part sandwich the second part of the document carrier therebetween, and wherein step (a) is practiced by placing two different documents into operative association with each document carrier, one on each side of the second part of the document carrier, between the second part and a portion of the first part of the document carrier.

6. A method as recited in claim 5 wherein the second part of at least some of the document carriers comprises a quadrate white border, having a large quadrate opening in the middle thereof, and wherein each document is large enough to cover at least most of the large quadrate opening in the document carrier; and comprising the further step of placing indicia on the white border of at least some of the document carriers.

7. A method as recited in claim 1 wherein at least some of the document carriers have means defining two pockets for receipt of documents between the transparent first part and the second part, sandwiched therebetween; and wherein step (a) is practiced by placing at least one document into each pocket.

8. A method as recited in claim 1 wherein the optical equipment is optical character reading equipment, and wherein step (b) is further practiced by reading optical characters on the document with the equipment.

9. A method as recited in claim 1 wherein the second part has either a length or width dimension larger than the first part to define a second part portion not covered by the first part, and wherein step (a) is further practiced by holding the second part portion not covered by the first part while inserting at least one document into a pocket between the first and second parts.

10. A method as recited in claim 2 wherein the substantially uniformly sized document carriers are quadrate and have dimensions of about 10×12½ inches, and wherein the substantially same size documents have dimensions of about 8½×11 inches, and wherein the step (b) is practiced to feed both said document carriers and said documents but not other sheets having significantly different sizes.

11. A document carrier for efficiently transporting documents to be optically acted upon comprising:
   a quadrate first part of transparent material which allows clear, non-interfering, scanning or microfilming of a document underlying it;
   a quadrate second part of non-adhesive material providing a clear discrimination background for the document, and allowing readable indicia to be placed thereon;
   said first and second parts having generally the same exterior length or width; and
   means for attaching said first part to said second part to allow placement and positioning of at least one document therebetween.

12. A carrier as recited in claim 11 wherein said second part has a width or length dimension slightly larger than that of said first part to define a second part portion not covered by said first part.

13. A carrier as recited in claim 11 wherein said first part is of sheet material selected from the group consisting essentially of polypropylene and polystyrene.

14. A carrier as recited in claim 13 wherein said second part is of white sheet material.

15. A carrier as recited in claim 14 wherein said first part has two portions, said second part sandwiched between said two portions of said first part.

16. A carrier as recited in claim 15 wherein said second part has means defining an enlarged opening therein having essentially the same quadrate configuration as said second part exterior, so that said second part forms a border within which a document to be carried is disposed.

17. A carrier as recited in claim 11 wherein said second part is about 20–24 lb. bond white paper, or an equivalent weight of offset paper.

18. A carrier as recited in claim 11 wherein said first part has two portions, said second part sandwiched between said two portions of said first part.

19. A carrier as recited in claim 13 wherein said first part is approximately 0.92 gauge film.

20. A carrier as recited in claim 11 wherein said means for attaching said first part to said second part comprises adhesive means for attaching said first and second parts together along three sides of the first part to form a pocket with the fourth side of the first part unconnected to allow insertion of a document into the pocket between the first and second parts.

21. A carrier as recited in claim 20 wherein said adhesive means comprises three strips of adhesive, a first strip about 1 inch in width, and second and third strips substantially less than one inch in width; and wherein said first and second parts and adhesive strips are dimensioned so that said pocket is approximately 8½″×11″ in dimension so that a 8½ by 11″ document may be inserted therein.

22. A carrier as recited in claim 11 further comprising optical equipment readable indicia on said second part.

23. A carrier as recited in claim 11 wherein said first part has dimensions of about 9½″×12⅝″, and said second part has dimensions of about 11½″×12⅝″; and wherein said means for attaching said first part to said second part comprises adhesive strips disposed along a plurality of edges of said first part, to define a pocket, said pocket having dimensions of about 8½″×11″.

24. A carrier as recited in claim 11 wherein said means for attaching said first part to said second part comprises strips of adhesive attaching said first and second parts together so as to form a pair of distinct pockets between said first and second parts for insertion of at least one document into each pocket to be held between said first and second parts.

* * * * *